Patented Nov. 18, 1952

2,618,645

UNITED STATES PATENT OFFICE 2,618,645

ORGANIC MERCURIALS

Albert Frank Bowles, Naugatuck, Conn.

No Drawing. Application November 12, 1948, Serial No. 59,753

5 Claims. (Cl. 260—434)

This invention relates to poly alkyl substituted aromatic compounds having a bivalent atom such as mercury or copper in combination therewith and more particularly relates to poly alkyl aromatic compounds having a bivalent metal atom such as mercury or copper in combination therewith and which compounds are suitable as medicinal and industrial bactericides and fungicides.

The general object of this invention provides for the preparation of poly alkyl aromatic compounds for use as the nuclei in preparing the bactericides and fungicides useful in treating various kinds of infections resulting from bacterial and fungus organisms, prevention of mildew, tree rot, fungus deterioration of shrubs, bulbs and plants, preserving skins and pelts, textiles, lacquers, paints, varnishes, paper, glues and adhesives, oils and fats.

One object of my invention is to prepare the poly alkyl compounds of a nucleus selected from the benzene series of hydrocarbons and having at least one of its nuclear hydrogen atoms substituted for a hydroxyl group, and may also have a second nuclear hydrogen atom substituted for a carboxylic acid, which poly alkyl substituted aromatic compounds have a bivalent metal atom such as copper or mercury in combination therewith.

A further object of this invention provides for the condensation of the alkylating agent with the aromatic nucleus in the presence of a cationic condensing agent at an initially low temperature and thereafter raising the temperature to an elevated range to complete the reaction.

The aromatic nuclei which may be used in preparing the poly alkyl compounds of the invention may be selected from the class consisting of phenol, cresol, resorcinol, guaiacol, catechol, naphthol, as also homologues of them.

In place of the aromatic nuclei the cycloaliphatic compounds such as cyclobutane, cyclopentane and cyclohexane may be advantageously used for preparing the bivalent metal compounds to be used as bactericides and fungicides, provided that one of the ring hydrogen atoms have been substituted for a hydroxyl group, and a second ring or cyclonuclear hydrogen is substituted for a carboxylic acid group.

In a like manner the heterocyclic ring compounds selected from the class consisting of pyridine, quinoline, indolene, acridine may be advantageously used as nuclei for preparing the poly alkyl substituted compounds having a bivalent metal atom in combination therewith, provided that such ring compounds have a nuclear hydrogen substituted for a hydroxyl group and a second nuclear hydrogen substituted for a carboxylic acid group.

The so called cationic condensing agents which may be used in the poly alkylating reactions of the invention belong to the metallo halides such as the chloride or bromide of aluminum, iron, tin, copper, zinc, etc. The metal halogen compound is used in its anhydrous phase and in the ratio of between 0.2 to 110% of the nucleus being used. The amount of the cationic condensing agent depends upon the alkylating agent being used. Where an acyclic or alicyclic hydrocarbon having a single ethylenic bond is used as the alkylating agent from 0.2 to 1.0 percent of the catalytic agent has been found quite satisfactory. Where an olefinic or paraffinic alcohol is used the amount of catalyst to be used will vary between 10% and 110% of the nucleus. These variations I have found to be due to the overall catalytic activity of the metallo halide selected. Since aluminum chloride is a strong and energetic catalytic agent it would require a very small amount to bring about the condensation, and since zinc chloride is a relatively weak catalytic agent it would require several times more than where the aluminum salt is used catalytically. In a like manner the metallo bromides are weaker catalytic agents than are the chlorides. So the catalyst selected for a given reaction is based, not upon the nucleus, although the catalyst bears a direct ratio to the nucleus, but to the nature of the alkylating agent used in the reaction.

As alkylating agents I have found that alkyl groups of different magnitudes are preferable. One of which alkyl substituents is not to exceed four carbon atoms and the second to be not less than four carbon atoms in the molecule. The alkylating agents which have been found preferable may be taken from the olefin or paraffin alcohols or from the olefins belonging to the acyclic and alicyclic group of hydrocarbons having not more than twenty carbon atoms in the molecule and not less than one ethylene bond. In a preferred embodiment of the invention, the olefins belonging to the group butylene-1, butylene-2, amylene-1, amylene-2, henene, heptene-2, heptene-3, octene-2, octene-3, octene-4, di-isobutylene especially the commercially available product composed of 62% 2,5 dimethyl hexene-3; 30% 2,4,4-trimethyl pentene-1 and 8% 2,4,4-trimethyl pentene-2 and the commercial dipentene product composed of 2,7 dimethyl octene-4 and di n-pentene-5, di n-propyl ethylene-3,6 are quite suitable, economically for preparing the poly alkyl aromatic nuclei of the present invention.

In an investigation of the technical literature and prior art, it has been found that a number of similar methods have been used heretofore in preparing the mono alkyl phenols from both the paraffin and olefin alcohols and the acyclic and alicyclic hydrocarbons, for example: Ber. 24: 3889 (1891) discloses the method of preparing alkylated phenol by adding a mixture of the phenol and olefin in molecular quantities to an ice cold solution of 1 volume concentrated sulfuric acid in 9 volumes of glacial acetic acid as solvent and using the ratio of 1 part by weight of the phenol to 2 parts by weight of the concentrated sulfuric acid.

In Monatshefte vol. 53–54, pp. 721–752 (1929), alkyl phenols are disclosed as prepared from equal molar mixture of the phenol and olefin condensed by means of 10–15 volumes equivalent of 70–80% sulfuric acid.

It is disclosed in Annales de Chimie, series 10, volume 11, pp. 550–556 that alkyl phenols may be prepared by condensing at a temperature above 90° C. the phenol and olefin molecular mixture with a Friedel-Crafts condensing agent.

In the Jour. Am. Chem. Soc. 53: 276 (1931) and 55: 2571 (1933) there is disclosed a method of condensing di-isobutylene with phenol using sulfuric acid as the catalyst and in the first disclosure there is obtained tetra methyl butyl phenyl ether, while in the second, the ether is rearranged to the tetra methyl butyl phenol.

In U. S. Patent 2,091,565 there is disclosed a process of condensing phenol and di-isobutylene in equimolecular amounts with an equi-catalytic quantity of aluminum chloride at a temperature between 90 and 110° C.

While in U. S. Patents 2,008,032 and 2,060,573, there is disclosed a condensation of molecular amounts of phenol and di-isobutylene with concentrated sulfuric acid in excess and in a large excess of glacial acetic acid as a solvent and obtains alpha, alpha, gamma, gamma tetra methyl butyl phenol which is thereafter mercuriated in the nucleus.

In U. S. Patents 2,137,236 and 2,163,745, there is disclosed mono alkyl resorcinols, anhydro cresols, and phenols having a mercuriated nucleus along with a nitro or halogen nuclear substitution, and in a like manner in U. S. Patent 2,297,636 there is disclosed a means of obtaining nuclear mercuriations of the heterocyclic bases, while in U. S. Patent Reissue 16,921 et seq. there is disclosed a means of preparing alkyl-thio-mercuri-benzoic acids, in which the alkyl groups are attached to one valence of the mercury atom.

It is known to the art that the metallo halogen cationic catalytic agents tend to polymerize and produce a large amount of a resinous product with the olefins at temperatures above 50° C. It is further known that the mineral acids in a like manner produce polymerization products and resins when such reactions are carried out at slightly elevated temperatures.

I have discovered that the olefins from the acyclic and alicyclic series of olefinic hydrocarbons may be readily condensed with aromatic compounds of the benzene series of hydrocarbons, cycloaliphatic hydrocarbons and heterocyclic bases, by means of the cationic condensing agents provided the initial temperature of the reaction is maintained between 15 and 30° C. for a period of time of between 30 minutes and 2 hours and thereafter gradually increasing the temperature to the optimum range at which the rearrangement takes place. It was further discovered preferentially that by conducting the initial reaction at a temperature of between 20–25° C. for a period of between 30 minutes and 1 hour and then slowly raising the temperature to 55–60° C. and holding between these temperatures for one hour and thereafter gradually increasing the temperature to 120–130° C. until the condensation was completed and then quickly raising to a temperature between 165 and 185° C. to complete the rearrangement, yields of between 70 and 84% of theory could be obtained without forming polymerization products and resins in the mixture, which tended to interfere with separation and purification of the main products.

I have discovered that the introduction of a sulfur atom bonded to a carbon of the nucleus while enhancing the bacteriostatic and fungistatic activity of the compound, also changes the bactericidal characteristics of the base or nucleus and detracts from the lethan or bactericidal potency of the compound. For example, where the sulfur atom is connected to an alkyl group of not more than three carbon atoms, which alkyl is nuclear connected, the bactericidal and fungicidal value of the nucleus, as in my invention the poly alkyl substituted aromatic compound, is increased as many as ten times the value of the original compound. Such sulfur atom is preferably used in the form of a thio compound and not as the free mercaptan.

I have found that where the toxicity of the compound is increased to any great extent by the substitution of a thio mercurial group, that for chemo-therapeutic administration it is preferable to use the poly alkyl substituted aromatic compound alone as the bactericidal agent.

I have further discovered that the process applied to the manufacture and preparation of the poly alkyl substituted aromatic bases, may be also applied to the preparation of the series of benzene hydrocarbons such as in the preparation of di-alkyl benzenes, toluenes and xylenes as well as naphthalenes, etc. which compounds afterwards may be used as reagents for preparing various other types of compounds useful in the art, as for example di-isopropyl benzene and toluene may be prepared by my method and thereafter used for preparing aromatic compounds possessing a high odoriferous character and useful intermediates for preparing perfumes and condiments having a high antiseptic and bactericidal value.

The compounds of the invention herein described having poly alkyl substituted aromatic nuclei and having a metallic atom in combination therewith may have the aromatic nuclei connected by means of an alkyl group of not more than eight carbon atoms or through a keto group and may be carbon to carbon connected through the ring without an intervening atom or group. It was discovered that the relationship of the alkyl substituents with respect to their chain magnitudes play an important role in increasing or decreasing their germicidal and fungicidal efficiencies. This relationship was found to bear a relationship of 1:3, 1:4, 1:5, 2:4, 2:6, 2:8 etc. It was experimentally found that where the alkyl substituent of lower magnitude was of the order of methyl ($CH_3$) the group of greater magnitude should be not less than propyl ($C_3H_7$). It is known that the alkyl phenols decrease in water solubility as the length of the alkyl substituted group increases and in like manner the free bases forming the nuclei of the compounds of my invention are totally insoluble in water but are soluble to a rather high degree in alcohol, ether, and most of the known organic solvents as well as a number of oils and fats. The alkaline salts are insoluble in oils, fats, solvents and alcohol but are soluble in from 12 to 14% in water, which is greater than would be required for both clinical and industrial application. The compounds of the invention, as set forth and described and having the base nucleus selected from the benzene series of hydrocarbons are represented by the following generic structure:

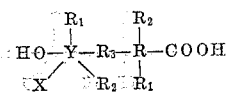

wherein $R_1$ signify alkyl substituents of the lesser magnitude having not more than 4 carbon atoms in its molecule. $R_2$ signify alkyl substituents of the greater magnitude of not less than three nor more than sixteen carbon atoms. Although in a preferred embodiment of the invention $R_1$ may be selected from the group between methyl and butyl, while $R_2$ may be selected from the group between propyl and octyl. Y signifies an aromatic nuclei selected from the benzene series of hydrocarbons. R signifies a group selected from the class consisting of aromatic, cycloaliphatic and heterocyclic. X signifies hydrogen or the metallo bivalent atom. $R_3$ signifies alkyl, keto or the direct carbon to carbon bond between the rings forming the nuclei and secondary substituent of the invention. Y and R may represent biphenyl, dibenzyl and such like, as long as the primary nucleus Y has a labile hydrogen of the ring substituted by a hydroxy group and the substituent R has a nuclear hydrogen substituted for a carboxylic acid group.

The products of the invention having poly substituted alkyl groups therein and a bivalent metal atom in combination therewith, are evidenced by a high degree of bactericidal and fungicidal activity, which is not the case of the alkyl substituted phenols and polyhydroxy alkyl phenols are concerned with respect to Gram negative and Gram positive bacterial organisms and fungi. It was discovered with both bactericidal and fungicidal efficiencies are controlled by the magnitude of the alkyl groups and the secondary ring substituent attached to the nuclei taken from the benzene series of hydrocarbons. The specificity of a given product may be limited to a single class such as the Gram negative or positive bacterial organisms or specific fungi or equally effective against both classes of organisms. This specificity is controlled first through the two ring system and second: by means of the alkyl groups substituted for labile hydrogen in the rings of the condensed product, and the positions occupied by such polyalkyl substituents.

It is known that the pathogenicity of a given bacterial organism depends upon the enzymes secreted from the protoplasm of the bacterial cell into host tissue and that these enzymes are protected by a polysaccharide coating or a glucosidal shell that prevents effective penetrating by the bactericidal agent. This accounts for the specificity of a given bactericidal agent for Gram negative or Gram positive bacterial organisms and not equi-effective against both. The compounds of my invention possess a high penetrating property for both glucosidal and polysaccharidal coatings so that they are capable of penetrating such coatings of the bacterial wall and not only effectively inactivate the bacterial enzymes but destroy their activity, by forming a complex compound with the proteinogenic matter of the bacterial protoplasm. In a like manner, it was discovered that in using polyalkyl substituted nuclei of the benzene series of hydrocarbons, that the toxicity of the agent decreases as the chain length of $R_2$ increases. The compounds 3 methyl 4 hydroxy 6 alkyl benzoic acid and 3 alkyl 4 hydroxy 6 methyl benzoic acids are comparatively nontoxic and possess phenol coefficiencies of 140 and 236 respectively.

The compounds of the invention may be further represented by the structural formula:

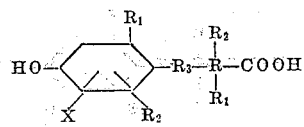

wherein R signifies the secondary ring taken from the class of benzene, cycloaliphatic having 4 or 5 carbon members in the ring or a heterocycle such as pyridine, quinoline and acridine. $R_1$ signifies an alkyl group of not more than four carbon atoms. $R_2$ signifies an alkyl group of not more than 8 carbon atoms. X signifies hydrogen or a bivalent metal group such as copper or mercury one of its valencies being connected direct or through another atom to the ring carbon and the remaining valence connected to an alkyl or acid producing group. $R_3$ signifies alkyl, keto or ring carbon to carbon bond. The hydroxyl and carboxylic acid groups of which must occupy the positions para to the other for the purpose of obtaining the highest degree of bactericidal and fungicidal activity.

The compounds containing the two rings specified can be obtained by condensing two cyclic nuclei in the presence of a cationic condensing agent to provide a carbon to carbon linkage between the two rings or by condensing in the presence of a cationic condensing agent an alkylene dihalide such as ethylene dichloride and isobutyl dichloride with the two rings to provide an alkylene linkage between the two rings or by condensing in the presence of a cationic condensing agent a ring carrying a halogenated alkyl group such as a chloro methyl group with the second ring to provide an alkylene linkage between the two rings as is apparent from the examples given below. The sodium or alkaline salt of such compounds render them water soluble to a large extent so that they may be administered without resorting to organic solvents.

I have also discovered that true synergism is obtained by adding from 0.1 to 1.0% of the mercurial dyes, selected from the group consisting of rose bengal, eosine, fluorone, fluorescein to the products of the invention. The addition of such dyes in a like manner, when such compounds are used pre-operatively, enable the surgeon to see the degree of penetration and antisepsis obtained before the operative work is completed and thereby to take the necessary precautions against infections.

The mercuriations or metallations of the polyalkyl substituted compounds of my invention may be carried out in several different manners. The compounds which I have found suitable are selected from mercuric halide, mercuric formate, mercuric propionate, mercuric acetate, alkyl mercuric formate, alkyl mercuric acetate, alkyl, mercuri alkyl halide, and the corresponding copper salts. The reactions are brought about by either fusion at an elevated temperature, although I have found that where such fusions are used that di-mercuriation generally takes place, so that in a preferred embodiment of the invention, the polyalkyl aromatic compound is dissolved in an alcoholic or organic solvent and heated to between 70 and 90° C. The metallizing agent is dissolved in a like volume of the solvent and heated to the same temperature and the two added together under efficient mechanical stirring and the heating and stirring continued for a period of time of between 2 and 4 hours to complete the reaction. The solvent is then removed by distillation under slightly reduced pressure and the mercuriated compound obtained in a crystalline form. In instances where the mercuriated compound is to be used in a solution, it has been found advantageous to concentrate the solvent under reduced pressure, until crystals begin to appear and then add the concentrated solution to the proper volume of solvent. The concentration of the solvent removes the organic acid, etc. from the solution and eliminates such material as impurities. It has been found that where the reaction does not go to completion in the mercuriation that the free mercury salt precipitates from the solvent solution upon cooling, and this means is used for its removal. In the practice of the invention, it has been found advantageous to use between 0.1 and 0.3 molal equivalents excess of the mercuriating agent or metallizing agent and after the reaction is completed, cool the solution and allow the excess metal salt to crystallize, and after filtering, concentrate the liquid as above. In this manner, there is no free base remaining in the bactericidal and fungicidal compound, although it has been found that between 0.1 and 0.5% of the free polyalkyl aromatic base tends to stabilize the metallized compound against decomposition and prevents photoactivity.

I have discovered that where two of the nuclear bases are connected by an alkyl group, that the hydroxyl of one aromatic nucleus may be reacted with thionyl chloride to give a halogen atom which is then removed by means of sodium hydrosulfide to give the mercaptan group and this is thereafter reacted with the metallizing compound to give the metal derivative.

From the foregoing disclosure it is readily apparent to one versed in the art that the scope of my invention is rather broad, and the products thereof are useful in several branches of the art as intermediates as well as in the preparation of the bactericides and fungicides described and claimed herein.

In order to more fully describe the products of my invention and the means whereby the invention is carried out, the following examples are given as illustrations thereof, but are not intended as a limitation upon the scope of the invention. The only limitation placed upon my invention is that imposed upon me by the claims appended hereto.

*Example 1*

In a 12 liter flask having a thermometer well, fitted with condenser, inlet funnel and efficient mechanical stirrer is placed a solution of 2161 gms. (20 moles) of meta cresol and 1123 gms. (10 moles) commercial di-isobutylene containing a mixture of 2,4-dimethyl hexene-3, 2,4,4-trimethyl pentene-1 and 2,4,4-trimethyl pentene-2. The flask is arranged for cooling and when the temperature reaches to 15° C. the stirrer is started and there is added slowly, so that the temperature is maintained at between 20–25° C. 75.0 gms. of anhydrous aluminum chloride in rice size crystals. The addition requires between 20 and 25 minutes. The temperature is maintained below 25° C. for approx. 30 minutes after the catalyst addition is completed and then raised to 45–50° C. for 30 minutes to 1 hour and then slowly raised to between 85–90° C. and held at this temperature for 2 hours and then quickly raised to 175–185° C. for approx. 30 minutes and cooled. 5 liters of 5% hydrochloric acid is then added ice cold, stirred and separated, extracted with benzene and the benzene extract washed twice with water, dried, and distilled. There is obtained 2561 gms. (78% of the theory) of a light yellowish oily product boiling at 5 mm. between 132 and 156° C.—upon fractionation of the oily product there was obtained 238 gms. of a light product boiling at 118–123° C. at 2.5 mm. (b) 512 gms. of a colorless oil which boiled at 131–137° C. at 2.5 mm. pressure and 1282 gms. of an almost colorless oily product boiling between 142 and 146° C. under 2.5 mm. pressure. The products were identified as: (a) isobutyl metal cresyl ether; (b) paratertiary butyl meta cresol, and (c) symmetrical isobutyl meta cresol.

*Example 2*

In a manner analogous to Example 1 there is reacted: 1080 gms. of meta cresol (10 moles) admixed with 560 gms. (5 moles) commercially obtained diisobutylene, with 24 gms. ferric chloride at a temperature of between 20–25° C. The reaction is carried out as in the preceding example and after washing, and drying there was obtained 1162 gms. (approx. 71%) of a viscous oily product distilling between 128 and 162° C. under 4.5 mm. pressure. Upon fractionation there was obtained 114 gms of a viscous oily material boiling at 114–120° C. at 4 mm. pressure, 123 gms. of an oily material boiling at 135–138° C. at 4 mm. pressure and 840 gms. of an almost colorless oil which boiled at 142–145° C. at 3 mm. pressure.

*Example 3*

In a manner analogous to the procedure given in Example 1, there is reacted 2060 gms. (20 moles) meta cresol, 1405 gms. (20 moles) pentene-1 (n-propyl ethylene) and 45 gms. anhydrous tin chloride in salt, crystal size. The reaction started initially between 20–25° C. The addition of the catalyst requires 35 minutes. The reaction is completed as described in Example 1. There is upon distillation obtained 2568 gms. of an oily product boiling at 146–154° C. at 3.5 mm. pressure, which upon fractionation gave 203 gms. boiling at 143–145° C. at 3.5 mm. pressure and 2280 gms. boiling at 152–155° C. at 4 mm. pressure and identified as 4 methyl butyl meta cresol.

*Example 4*

In a reaction equipment and in a manner analagous to that given in Example 1, there is reacted 2060 gms. (20 moles) meta cresol, 1405 gms. (20 moles) 2,6 di methyl octene-4 and 70 gms. anhydrous aluminum chloride. After completing the reaction, purifying and drying and distilling, there was obtained 2450 gms. (approx. 71%) of a viscous, yellow colored oil boiling between 143 and 162° C. at 3 mm. Upon redistillation, there was obtained an oily material boiling between 138–145° C. at 3 mm., amounting to 118 gms. and 2281 gms. of an almost colorless oil boiling at 152–156° C. at 3 mm. pressure. The product was identified as symmetrical iso amyl meta cresol. A sample prepared by condensing two moles of 86-98% pure meta cresol and 5 moles iso amyl alcohol with 3 moles anhydrous, fused zinc chloride at 140-145° C. and completing at 180-185° C. and after washing, and drying, distilled between 80° C. and 166° C. the alcohol was removed and the oily product upon fractionation boiled at 152-155° C. at 3.2 mm. pressure.

*Example 5*

In a suitable reactor having a thermometer well, inlet funnel, reflux condenser with a tube leading to a trap and an efficient mechanical stirrer is placed a mixture composed of 5305 (20 moles) symmetrical butyl meta cresol and 990 gms. (10 moles) ethylene dichloride, the stirrer is started and the solution cooled in an ice water bath to between 20-25° C. There is added in the course of about one hour, at such rate that the temperature is maintained below 30° C., 250 gms. anhydrous aluminum chloride. Stirring is continued for 3 hours after the aluminum chloride has been added and the mixture allowed to stand overnight at room temperature. The mixture is then heated to 120-125° C. for 30 minutes and cooled. The mixture is diluted with 3 liters of benzene and cautiously poured upon 2 kg. of cracked ice and dilute hydrochloric acid. The oily layer is separated and washed until free of acid with water, dried and distilled at atmospheric pressure to remove the benzene solvent. The viscous, oily material remaining is distilled under reduced pressure. The fraction boiling at 196-203° C. at 2 mm. pressure being collected, which solidifies to an oily solid upon cooling. This fraction amounted to 4319 gms. and the fore-run distilling at 178-183° C. 2 mm., amounted to 805 gms. and remained a thick viscous light yellow oil. The overall yield amounted to 91.6% of theory. The main product was 4,4-ethyl bis, bis symmetrical isobutyl meta cresol.

Molecular weight 354.51.

Calculated for $C_{24}H_{34}O_2$; $C=84.3\%$; Found: $C=84.1\%$.

In a 5 liter flask provided with a thermometer well, reflux condenser bearing a tube leading to a trap, an efficient mechanical stirrer and an inlet tube reaching to near the bottom of the flask is placed a solution of 1420 gms. (4 moles) 4,4 ethyl-bis, bis (symmetrical) iso butyl meta cresol dissolved in 2 liters of anhydrous benzene. The stirrer is started and the flask warmed to 70-75° C. and 480 gms. (4 moles) dry, pure thionyl chloride added in the course of 40 to 50 minutes. After 30 to 40 gms. of the thionyl chloride has been added, there is a steady evolution of hydrogen chloride and sulfur dioxide evolved, which is led to the trap. After the thionyl chloride has been added the stirring is continued and the reaction mixture heated to a reflux and maintained at a vigorous reflux until the evolution of gases has ceased. While continuing the stirring, the mixture is cooled to between 40 and 50° C. and a solution of 230 gms. (4 moles) sodium hydrosulfide in 500 ccs. cold water added rapidly and the stirring continued for one hour. Sodium crystallizes out and after standing for 4 to 5 hours, filtered with suction, and the oily layer separated from the aqueous portion. The benzene solvent is recovered, and replaced with 3 liters 80% ethyl alcohol. There is then added in a steady stream at between 55 and 60° C., a solution of 1210 gms. isopropyl mercuric acetate in 3 liters of 80% ethyl alcohol. The solution is heated to 85-90° C. and stirred for 5 hours and then cooled. The mercuric salt crystallizes out, and is filtered off, and washed on the filter with small successive portions of cold alcohol and the almost white, to slight buff, colored crystalline product dried.

*Example 6*

In a 12 liter flask connected with an efficient reflux condenser with a lead tube connected to a trap, is placed 1420 gms. (4 moles) of 1,1-dihydroxy, 3,3-dimethyl, 5, 5 di isobutyl, 4,4 di phenyl ethane (4,4-ethylene-bis, bis (symmetrical) iso butyl meta cresol) dissolved in 2 liters of anhydrous alcohol. To the alcoholic solution is added a solution of 240 gms. of sodium hydroxide dissolved in warm 96% alcohol. The stirrer is started and 655 gms. (4 moles) tri chlor acetic acid added at such rate that the temperature is maintained at below 35° C. for two hours after the addition is completed. The solution is then heated to a gentle reflux and maintained at a reflux for two hours, allowed to cool when the salt crystallizes out, and is filtered off. The alcoholic solvent is removed, and the solid material taken up in anhydrous benzene and treated with 480 gms. of thinoyl chloride at a temperature of between 75 and 80° C., after the thionyl chloride has been added, the stirring is continued and the reaction mixture heated to a reflux until the evolution of gases cease. The benzene solvent is distilled away and replaced with 2 liters of 70-80% alcohol and an alcoholic solution of 225 gms. of sodium hydrosulfide in 1 liter of 70-80% alcohol added. Sodium chloride crystallizes out after about one hour and is filtered off. There is then added in a stream, a solution prepared from 1210 gms. of isopropyl mercuric acetate dissolved in 2 liters 70-80% alcohol. The mixture is stirred and heated to a gentle reflux and continued for 5 hours. 3 liters of hot water is then added and 3 liters of alcohol removed by distilling at atmospheric pressure. Upon cooling the mercuriated compound crystallizes in needles and are filtered on a Buchner filter and thereafter dried.

*Example 7*

In an autoclave is placed 2085 gms. (10 moles) of 5 isobutyl meta cresol and a solution of 420 gms. of sodium hydroxide in 1 liter alcohol then added. Carbon dioxide is then introduced until the pressure reads 180 lbs. The mixture is mechanically stirred and heated to 140° C. The pressure increases as the heating increases and reaches 1400 p. s. i. The heating is removed and the reaction begins. The pressure rises quickly to 1500 to 1550 p. s. i. and then drops. At room temperature the pressure is substantially zero. The reaction mixture is poured into 2.5 liters of dilute hydrochloric acid and allowed to stand for several hours to crystallize. The filter cake is washed with successive 100 cc. portions of ice cold water and dried. There is obtained 1300 gms. (62.5%) of 2 isobutyl 4 hydroxy 6 methyl benzoic acid.

1250 gms. (6 moles) of the 2 isobutyl 4 hydroxy 6 methyl benzoic acid obtained from the preceding reaction dissolved in 3 liters of 70% alcohol and placed in a suitable reaction flask having a long efficient reflux condenser, mechanical stirrer and inlet funnel. The stirrer is started and the solution heated to 80° C. Through the funnel is introduced a solution of 1814 gms. (6 moles) of isopropyl mercuric acetate dissolved in 3 liters of 70% alcohol heated to 70° C. the mixture then stirred and refluxed for 5 hours. 4 liters of hot water is then added, the condenser reversed and 4 liters of alcohol removed by distillation at atmospheric pressure. On cooling, the mercuric compound crystallizes in feathery needles. The crystalline compound is filtered off, washed with successive 100 cc. portions of ice cold water and dried. The free base is soluble in alcohol, ether, vegetable oils and fats. By dissolving the free base in a molecular equivalent of an alkaline agent in aqueous solution, the water soluble mercurial is obtained.

Example 8

In a suitable apparatus, analogous to Example 1 and at an initial temperature of between 20–25° C. a solution of 1382 gms. (10 moles) of para hydroxy benzoic acid dissolved in 2 liters of dioxane is placed and to which is added 702 gms. of pentene-1. There is added in the course of 30 to 40 minutes 45 gms. of anhydrous stannic chloride. Stirring is continued for approximately 1 hour after the addition is completed. The mixture is then slowly heated to between 55 and 60° C. and after 2 hours the temperature is raised to between 120 and 130° C. for one hour. Cooled and dissolved in a solution of 400 gms. of sodium hydroxide in 4 liters of water. The dioxane separates and the aqueous solution of the base drawn off. The solution is heated to a boil and 15 gms. of decolorizing carbon added and the mixture stirred and boiled for 15 minutes, cooled, filtered and the free acid base precipitated with dilute hydrochloric acid and the crystallized compound suction filtered and the filter cake washed with successive portions of ice water on the filter until free of acid and dried. The yield varies between 63 and 78% of theory of 2 alpha methyl butyl 4 hydroxy benzoic acid.

By replacing the para hydroxy benzoic acid with 1382 gms. of salicylic acid, there is obtained 67% of theory of 2 hydroxy 5 alpha methyl butyl benzoic acid.

By substituting 1522 gms. of 2 methyl 4 hydroxy benzoic acid for the para hydroxy benzoic acid in the above example, there is obtained 71% of 2 methyl 4 hydroxy 5 alpha methyl butyl benzoic acid.

The cresyl carboxylic acids are prepared as described in Example 7 preceding, by treating the cresol with an alcoholic solution of sodium hydroxide with carbon dioxide under pressure and precipitating as the free acid by means of dilute hydrochloric acid.

Example 9

In a 12 liter flask bearing a reflux condenser, efficient mechanical stirrer, thermometer and inlet funnel is placed 10 moles of the polyalkyl aromatic compounds prepared as described in Examples 1 to 5 and 60 moles of concentrated hydrochloric acid added, the stirrer is started and 30 moles of 37% formic aldehyde added. The temperature is kept below 55° C. for 6 hrs., the oily layer which separates on top of the acid solution is drawn off and washed free of acid and dried. The chloro methyl substitution product is then distilled under reduced pressure. The 4 chloro methyl 5 isobutyl meta cresol boils at 173–181° C. at 4 mm. pressure.

Example 10

In a suitable reaction apparatus, analogous to the procedure given in Example 1, there is reacted 1080.6 gms. (10 moles) meta cresol, 2262.8 gms. (10 moles) of 5-n-butyl 2 mercapto benzoic acid, 1123 gms. commercial di iso butylene by means of 75 gms. of anhydrous aluminum chloride. The initial reaction between 20–25° C. is maintained for 40 minutes and allowed to stand at room temperature for two hours and then stirred and heated to 120–130° C. in the course of 1 hour, cooled and decomposed by adding 2 liters of cold 5% hydrochloric acid, the mixture filtered and the filter cake washed free of acid and dried. M. P. 97.5–99° C.

In a 12 liter flask having reflux condenser, mechanical stirrer and funnel, is placed a solution of 430.7 gms. (1 mole) tri iso butyl meta cresyl 2 mercapto salicylic acid dissolved in 2 liters of 70% alcohol. The stirrer is started and the solution heated to 80° C. and a solution of 288.8 gms. (1 mole) ethyl mercuric acetate in 2 liters of 70% alcohol added. The mixture is heated to a reflux and stirred for 5 hours. 3 liters of hot water is then added and the condenser reversed and 2 liters of alcohol recovered. Upon cooling the feathery crystals of the thio mercuric compound crystallize out as feathery needles which are filtered by suction and washed with ice cold water and dried. The yield amounted to 607 gms. approximately 92% of theory. The sodium salt is soluble to slightly more than 11% in water. The mercuric compound is a powerful bactericide and fungicide.

The mercapto benzoic acids used in the invention are prepared by treating the alkyl salicylic acid to prepare an alkyl ester of the carboxylic acid group, and reacting the alkyl ester with thionyl chloride and reacting the chloro compound with sodium hydrosulfide. Other mercapto carboxylic acid compound may be used instead of the benzoic acid given in the example.

Example 11

In a 5 liter flask provided with reflux condenser, mechanical stirrer and inlet funnel and having a thermometer well, is placed a mixture of 554 gms. (2 moles) of 3 mercapto methyl 5 carboxy cyclopentane hexyl chloride and 329 gms. (2 moles) 6 iso butyl meta cresol dissolved in 2 liters of carbon bisulfide. The stirrer is started and the mixture cooled to between 10 and 15° C.; there is added at such rate that the temperature does not rise above 20° C. 130 gms. anhydrous aluminum chloride. The addition requires approximately 45 minutes. After the addition is completed the reaction mixture is allowed to stand for 5 hours. The condenser is replaced with a 16 inch distilling column and the carbon bisulfide removed under slightly reduced pressure. The reaction mixture is cooled and poured upon 1 kg. of cracked ice and 1 liter of dilute hydrochloric acid. The mixture is filtered by suction and the filter cake washed on the filter with cold water until free of acid. After sucking dry the filter cake is broken up and dissolved in 3 liters of 70% alcohol, placed in a 5 liter flask connected with a stirrer, condenser and funnel. The solution is then heated to 80° C. and a solution of 578 gms. (2 moles) ethyl mercuric acetate dissolved in 2 liters of 70% alcohol added. The mixture is then stirred and heated to a reflux and maintained at a low boil for 5 hours. 3 liters of alcohol are distilled off and replaced with 3 liters of hot water. Upon cooling the mercuric compound crystallizes out in shining plates. The overall yield of the mercuric compound amounts to 83% of theory.

Example 12

In an analogous manner to the preceding example and in suitable reaction apparatus, there is reacted 2083 gms. 6 n-amyl meta cresol, 2123 gms. 5 isopropyl 2 mercapto benzoic acid and 1291 gms. isobutyl dichloride, in 4 liters of dioxane by means of 800 gms. anhydrous aluminum chloride. The resulting compound, after purifying and drying, and recrystallizing from petroleum ether toluene, melts at 98.6–100° C.

430.7 gms. of the resulting product dissolved in 3 liters of 70% alcohol, 302 gms. of isopropyl mercuric acetate dissolved in 2 liters of 70% alcohol are stirred and boiled for 5 hours. 3 liters of the alcohol solvent are recovered and replaced with a like amount of water. Upon cooling the mercuric compound crystallizes out and is filtered off, washed with cold water on the filter and dried. The yield amounts to 586 gms. of a light buff color.

Ethyl cupric acetate, isopropyl cupric acetate may be used to replace the mercuric acetate with a higher fungicidal activity against the slime mold and bacteria with a considerably lower toxicity index.

Other alkyls may be used to replace the propyl, butyl and amyl groups described in the foregoing examples.

Compounds of the formulae

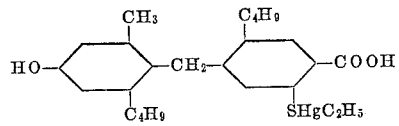

and

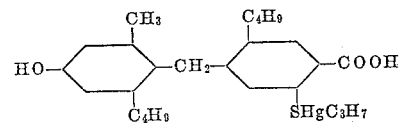

can be prepared in accordance with the methods disclosed in the examples using the apparent appropriate compounds for condensation and mercuriation.

This invention is a continuation in part of my copending patent application Serial No. 693,824 filed August 29, 1946, and relating to organic mercurials, which was a continuation in part of my copending patent application Serial No. 679,544 filed June 26, 1946, and relating to organic mercurial bactericides and fungicides.

Having therefore described my invention and shown by many examples whereby the products thereof are to be prepared, what is claimed therefore as new and novel and for which a patent is sought, is:

1. The bactericide and fungicide having the structural formula:

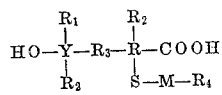

wherein Y signifies an aromatic nucleus selected from the benzene series of hydrocarbons, R signifies a ring compound which serves as a secondary nucleus and directs the specific characteristics of the resulting product and which is selected from the group consisting of aryl, aromatic, cycloaliphatic and heterocyclic nuclei, $R_1$ signifies an alkyl radical having not more than 4 carbon atoms, $R_2$ signifies an alkyl radical having not more than 8 carbon atoms, $R_3$ signifies a member selected from the group consisting of a carbon to carbon bond and alkylene and keto carbonyl radicals, M is a bivalent heavy metal atom selected from the class consisting of copper and mercury and $R_4$ is an alkyl group.

2. The bactericide and fungicide according to claim 1 having the structural formula:

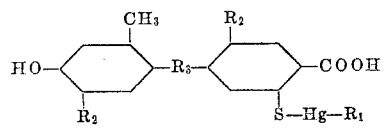

wherein $R_1$ signifies an alkyl group having not more than four carbon atoms, $R_2$ signifies an alkyl group having not more than eight carbon atoms, $R_3$ signifies an alkylene group having not more than eight carbon atoms and connecting the two rings together.

3. The organic mercurial compound, a bactericide and fungicide, according to claim 1 and having the structural formula:

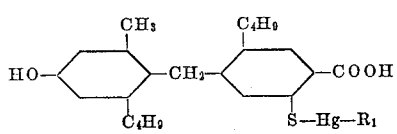

wherein $R_1$ signifies an alkyl group having not more than four carbon atoms.

4. The poly substituted dual ring bactericide and fungicide, having the structural formula:

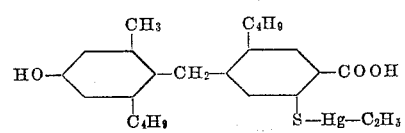

5. The poly alkyl substituted dual ring bactericide and fungicide having the structural formula:

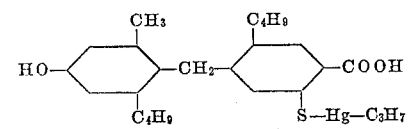

ALBERT FRANK BOWLES.

REFERENCES CITED

The following references are of record in the file of this patent:

UNITED STATES PATENTS

| Number | Name | Date |
|---|---|---|
| 1,672,615 | Kharash | June 5, 1928 |
| 2,137,236 | Christiansen et al. | Nov. 22, 1938 |